United States Patent

[11] 3,634,141

[72] Inventor: Masaki Hirashima, Yokohama, Japan
[21] Appl. No.: 39,737
[22] Filed: May 22, 1970
[45] Patented: Jan. 11, 1972
[73] Assignee: Matsushita Electric Industrial Co., Ltd., Osaka, Japan
[32] Priority: Sept. 7, 1965
[33] Japan
[31] 40/54419
Continuation of application Ser. No. 577,219, Sept. 6, 1966, now abandoned. This application May 22, 1970, Ser. No. 39,737

[54] APPARATUS FOR DIRECT GENERATION OF ELECTRICITY
4 Claims, 5 Drawing Figs.

[52] U.S. Cl. .................................................. 136/83, 136/6, 136/153
[51] Int. Cl. ........................................................ H01m 23/00
[50] Field of Search ............................................. 136/83, 120, 153, 6

[56] References Cited
UNITED STATES PATENTS

| 1,717,413 | 6/1929 | Rudenberg | 136/83 T |
| 2,631,180 | 3/1953 | Robinson | 136/83 R |
| 2,905,740 | 9/1959 | Smyth et al. | 136/120 R |
| 3,003,017 | 10/1961 | Weininger | 136/153 |
| 3,160,531 | 12/1964 | Spindler | 136/120 R |
| 3,255,043 | 6/1966 | Bettman | 136/83 R |

FOREIGN PATENTS

| 853,930 | 11/1960 | Great Britain | 136/83 R |

OTHER REFERENCES

The Glass Industry, Vol. 37, No. 7, July 1956, pp. 381– 385, 399, 402.

Primary Examiner—Winston A. Douglas
Assistant Examiner—C. F. Lefevour
Attorney—Stevens, Davis, Miller & Mosher ABSTRACT: A cell-type apparatus for directly generating electric power which comprises an enclosed glass tube made of glass containing sodium oxide, an anode and a cathode disposed respectively on the inner and outer surfaces of said glass tube, and vapor of cesium filling said glass tube; and which is used at an elevated temperature above about 100° C.

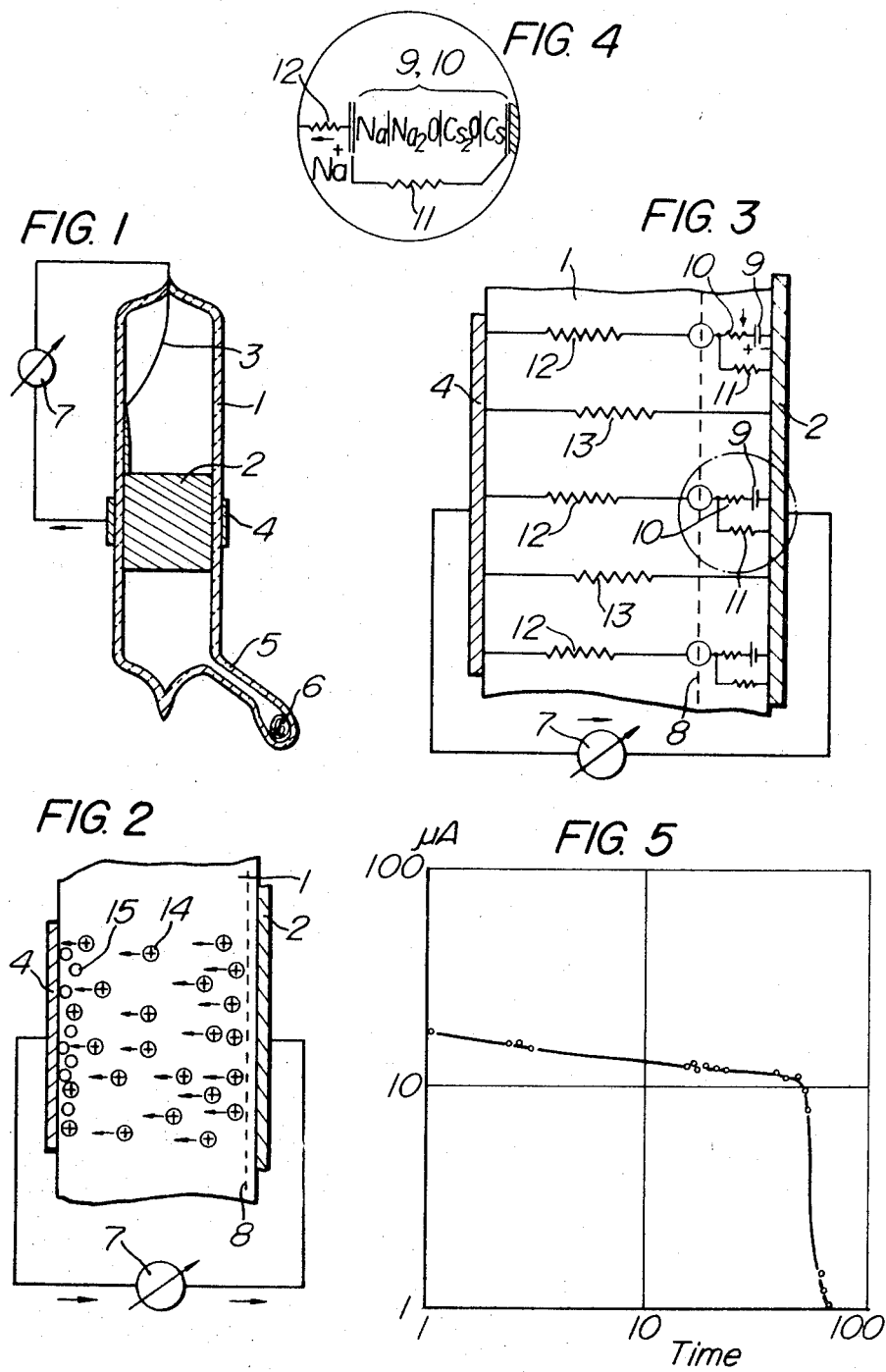

APPARATUS FOR DIRECT GENERATION OF ELECTRICITY

CROSS-REFERENCE TO A RELATED APPLICATION

This application is a continuation application of the U.S. Pat. application Ser. No. 577,219 filed on Sept. 6, 1966 now abandoned.

BACKGROUND OF THE INVENTION

1. Field of the Invention

This invention relates to apparatus of the cell-type for the direct generation of electricity.

2. Description of the Prior Art

Various types of direct power generators, such as electric primary cells, are known, However, such known generators are necessarily either complicated, have a large specific weight or generate a relatively low electromotive force.

SUMMARY OF THE INVENTION

The object of this invention is to overcome the above-mentioned disadvantages of the known apparatus and to provide an entirely novel apparatus for the direct generation of electricity which has an extremely simple structure but nevertheless a relatively large electromotive force.

In order to achieve the above object, the apparatus of this invention comprises an enclosed glass tube made of glass containing sodium oxide in relatively large quantities, an outer and an inner electrode disposed respectively on the outer and inner surfaces of the glass tube, and cesium vapor filling the glass tube; and the said apparatus is heated to a temperature of at least 100° C.

Features and merits of this invention will be clarified in the following description given in connection with embodiments of this invention and with reference to the accompanying drawings.

BRIEF DESCRIPTION OF THE DRAWINGS

FIG. 1 is a sectional view of a direct generating apparatus embodying this invention.

FIG. 2 is a schematic diagram illustrating the principle of the generation of electricity by the apparatus shown in FIG. 1.

FIG. 3 is an equivalent circuit diagram typically illustrating, by means of a model, the operation of the apparatus shown in FIG. 1.

FIG. 4 is an enlarged illustrative view showing an important part of FIG. 3.

FIG. 5 is a graph showing an example of the operation of the apparatus.

DESCRIPTION OF THE PREFERRED EMBODIMENTS

Referring now to the drawings and particularly to FIG. 1 thereof, reference numeral 1 designates a glass tube containing sodium oxide ($Na_2O$) in relatively large quantities compared with ordinary glasses. Reference numeral 2 designates a thin film of metal deposited on the inner surface of the glass tube 1. The film is connected to a lead wire 3 of platinum, for example, which is led out of the tube. This film constitutes an inner electrode. An outer electrode 4 is disposed, opposite the thin film 2, on the outer surface of the glass tube 1. The material of the inner electrode is selected from metals which are not attacked by cesium, such as platinum, molybdenum, tantalum, aluminum or magnesium. The outer electrode 4 was made of a pasted platinum film or a pasted silver film in this embodiment. However, it has been proved that the outer electrode 4 may be made of a deposited film of any other ordinary metal which is conventionally used for an electrode. Reference numeral 5 designates an appendage connected to the main glass tube 1. In the appendage 5, there is contained a cesium vapor source 6. As the cesium vapor source 6, a mixture containing, for example, cesium chromate and a reducing agent such as, for example, zirconium, silicon or aluminum in a suitable proportion may be used. The mixture is usually encased in a nickel capsule. After evacuating the glass tube 1 on a pump, the capsule containing the cesium vapor source 6 is heated from the outside by induction heating or by other suitable methods. Then cesium chromate is reduced by the reducing agent to produce cesium vapor. After admitting this cesium vapor into the main glass tube 1, the appendage 5 is cut off the main glass tube 1. Finally, the main glass tube 1 is sealed and removed from the pump.

The whole apparatus thus prepared is then placed in an electric oven and heated to a high temperature, for example, of above 100° C. Then the following chemical reaction may take place between the sodium oxide ($Na_2O$) contained in the material of the glass tube 1 and cesium (Cs), and as a result, sodium ions (positive ions) may be produced:

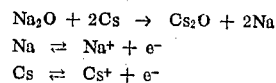

where $e$ denotes the electronic charge.

Since the radium of a cesium atom, which plays an important role in the above-mentioned reaction, is much larger than that of a sodium atom, the cesium atoms can not penetrate very deeply into the glass. Accordingly, it is considered that said chemical reaction takes place in a close vicinity to the inner surface of the glass. Experiments indicated that the depth of penetration of cesium atoms was about a few 10 microns at the most. Then the following system may be constituted due to said chemical reaction:

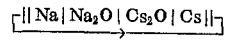

Since cesium is a more electropositive element than sodium and cesium atoms lose their outermost electrons more easily than sodium atoms, the cesium constitutes the cathode and the sodium the anode in said system, as is evident from the theory of the galvanic cell. Thus, the apparatus shown in FIG. 1 operates as a type of battery and an electric current may flow from the outer electrode 4 to the inner electrode 2 when they are connected by a wire. The electromotive force (e.m.f.) of this battery is found to be as high as 3.2 volts This value is much higher than that heretofore obtained with conventional batteries and the generation mechanism is based upon a quite novel principle.

It is generally known that it is the sodium ions 14 that contribute to the electric conduction through the glass 1, as illustrated in FIG. 2 A small part of these sodium ions may be produced by the electrolysis of sodium oxide ($Na_2O$) due to the electric current passing through the glass 1 but most of them are produced by reduction of sodium oxide by cesium. The sodium ions 14 will be transported in the direction of the arrows due to the electric field in the glass 1 produced by the e.m.f. described above. When the sodium ions 14 reach the outer electrode 4, part of their positive charges will be neutralized by the electronic charges which have been carried through the external circuit from the inner electrode 2. Thus some of the sodium ions 14 will become neutral sodium atoms and remain in the glass in the vicinity of the outer electrode 4. As a result, the concentration of neutral sodium atoms will increase in the region near the outer electrode 4, while it will decrease in the region near the inner electrode 2, thus a concentration gradient of sodium atoms will be set up between the two electrodes. The neutral sodium atoms will therefore tend to diffuse toward the inner electrode 2. Thus, an equilibrium between the out-diffusing sodium ions 14 toward the outer electrode 4 due to the electric field and the back-diffusing neutral sodium atoms 15 toward the inner electrode 2 will be maintained at a steady state. The electric current under this equilibrium condition may be limited by the resistance of the glass, and said electric current will increase exponentially when the temperature of the glass is elevated.

Experimental results may be well construed by assuming a model as shown in FIG. 3. In FIG. 3, reference numeral 9 denotes a galvanic cell as described above, reference numeral 10 denotes the internal resistance of the cell, and reference numeral 11 denotes the leakage resistance. This part is shown in FIG. 4 in more detail. Reference numeral 12 denotes the equivalent resistance which represents the ionic conduction by the sodium ions produced in the region 8 by virtue of said chemical reaction. THe resistance of the glass 1 itself is assumed to be represented by a resistance 13. The depth of the layer 8, measured from the inner surface of the glass 1, is of the order of a few 10 microns. The resistance 13 is assumed to be unaffected by the presence of the minute cells 9, but it is undoubtedly much larger than the resistance 12, and therefore, the resistance 13 may be neglected.

As will be evident from the above description, the apparatus will continue to operate as long as cesium is supplied. But cesium will be gradually consumed in the course of said chemical reaction and the generated e.m.f. will gradually decrease in magnitude with the consumption of cesium. As the cesium is used up, the e.m.f. drops to a value as low as several 10ths of a volt. An example of experimental results is shown in FIG. 5, in which the curve represents the short-circuited current vs. time characteristic, obtained with an apparatus as shown in FIG. 1, at a constant operating temperature of 240° C.

The short-circuited current may be made much larger by making the glass thinner or by making the sodium-oxide content of the glass as large as practicably possible. It may also be increased by increasing the areas of the inner and outer electrodes. When the temperatures of the glass is elevated, the current is also increased. But raising the temperature is accompanied by an increased consumption of the cesium and hence a shorter life of the apparatus.

Examples of e.m.f. obtained by the apparatus of this invention are shown in the following table 1.

TABLE 1

| Tube temperature | e.m.f. | |
|---|---|---|
| | Pt film as outer electrode | Ag film as outer electrode |
| 130° C. | 3.04 v. | 2.80 v. |
| 150° C. | 3.09 | 2.78 |
| 170° C. | 3.14 | 2.74 |

It will be noted that the e.m.f. is higher with the apparatus having n outer electrode of Pt than with the one having an Ag electrode. It is inferred that the difference in e.m.f. might be due to a difference in the content potential of the respective metals or other factors, but a definite conclusion cannot be drawn at the present stage.

In the above embodiment, a continuous metal film is used as the inner electrode. It should be noted that in that case the film must be made so thin that the filled vapor of cesium can penetrate through the film to reach the underlying glass surface. If the inner electrode is made in the form of a grid or a spiral, the vapor of cesium will more readily make contact with the glass surface.

Further, a layer of cesium atoms adsorbed on the inner wall of the glass tube forming a monoatomic layer of low resistance, can be used as the inner electrode. Therefore, the metal film for the inner electrode may be dispensed with under certain operating conditions.

Moreover, the glass tube may be made even of Pyrex glass (trademark) or quartz which contains a small percentage of sodium oxide, in cases where the apparatus is used to provide only an electric potential but no power.

I claim:

1. An apparatus for direct generation of electricity which is used at an elevated temperature of at least 100° C., said apparatus comprising an enclosed glass tube, the glass of said glass tube containing an oxidation electrode of sodium oxide therein; an outer metal electrode disposed on the outer surface of said glass tube; an inner metal electrode not attacked by cesium disposed on the inner surface of said glass tube; and a reduction electrode of cesium vapor filled in said glass tube.

2. An apparatus as defined in claim 1, wherein said inner electrode is thin film of metal which is substantially not attacked by cesium.

3. An apparatus as defined in claim 1, wherein said inner electrode is a foraminate structure of a metal which is substantially not attacked by cesium.

4. An apparatus as defined in claim 1, wherein said reduction electrode consists of a layer of cesium atoms adsorbed on the inner wall of said glass tube.

* * * * *